Feb. 13, 1962 J. A. HOCKETT 3,020,972
COMBINATION UTILITY CART AND EXTENSION LADDER
Filed March 7, 1960 2 Sheets-Sheet 1
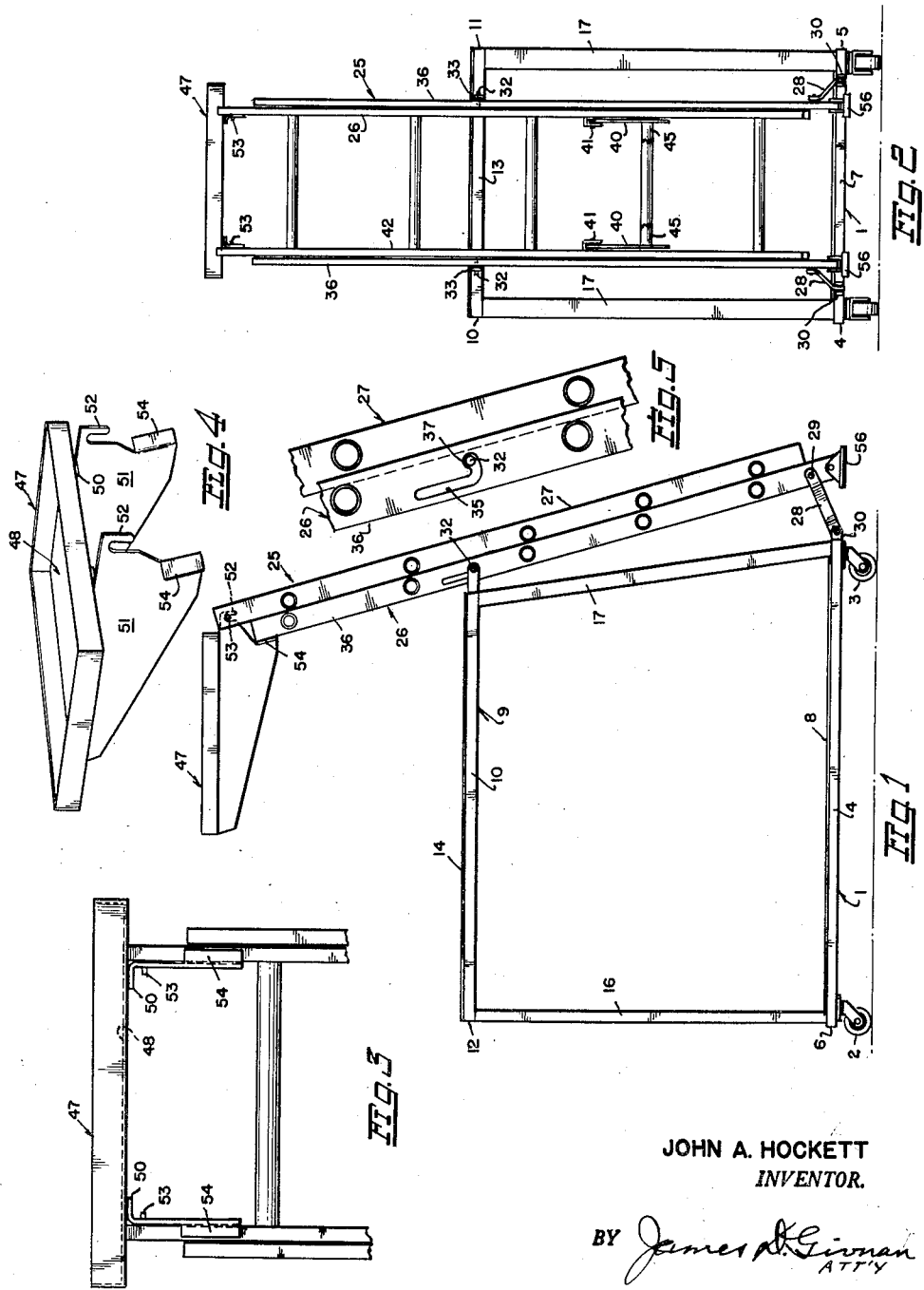
JOHN A. HOCKETT
*INVENTOR.*
BY *James D. Girman*
ATT'Y Feb. 13, 1962 J. A. HOCKETT 3,020,972
COMBINATION UTILITY CART AND EXTENSION LADDER
Filed March 7, 1960 2 Sheets-Sheet 2

JOHN A. HOCKETT
*INVENTOR.*

BY *James D. Girman*
ATTY

United States Patent Office 3,020,972
Patented Feb. 13, 1962

3,020,972
COMBINATION UTILITY CART AND EXTENSION LADDER
John A. Hockett, 4701 SE. 128th Ave., Portland 33, Oreg.
Filed Mar. 7, 1960, Ser. No. 13,261
2 Claims. (Cl. 182—15)

This invention relates to improvements in utility carts and more particularly to a cart especially adapted for general use by those rendering janitorial services.

One of the principal objects of the invention is to provide a cart of the character described, in combination with an extension ladder, and wherein the cart and ladder are readily portable as a unit which is simple in arrangement and construction, strong, durable, efficient and convenient in its use, and comparatively inexpensive to manufacture.

Another object is the provision of a combination, as above stated, wherein the cart is designed to support a wide assortment of tools, materials and other items and instrumentalities used in janitorial work and, in addition thereto, a number of standard size refuse receptacles nested one within the other and capable of removal from the cart one at a time without disturbing any other articles supported by the cart.

Another object of the invention is the provision of an extension ladder, as aforesaid, which is readily adjustable relative to the cart into an extended position, and so related to the cart when extended or retracted that the center of gravity of a user's weight upon the ladder will be between the forward and rearward end of the cart to thus prevent any tipping of the cart.

A further object is the provision of means for lowering the extension ladder as a unit relative to the cart into stabilized engagement with a floor to prevent unintentional movement of the cart.

The foregoing and other objects and advantages which will become subsequently apparent reside in the details of construction and operation as more fully hereinafter described and claimed, reference being had to the accompanying drawings forming a part hereof and in which:

FIGURE 1 is a side elevational view of a utility cart made in accordance with my invention.

FIGURE 2 is an elevational view thereof as seen from the right of FIGURE 1.

FIGURE 3 is a fragmentary detail view on an enlarged scale of the upper end of FIGURE 1 as viewed from the left thereof.

FIGURE 4 is a perspective view of a tray and supporting means therefor.

FIGURE 5 is a fragmentary detail view on an enlarged scale of means for locking the ladders in an elevated position relative to the cart.

Figure 6:
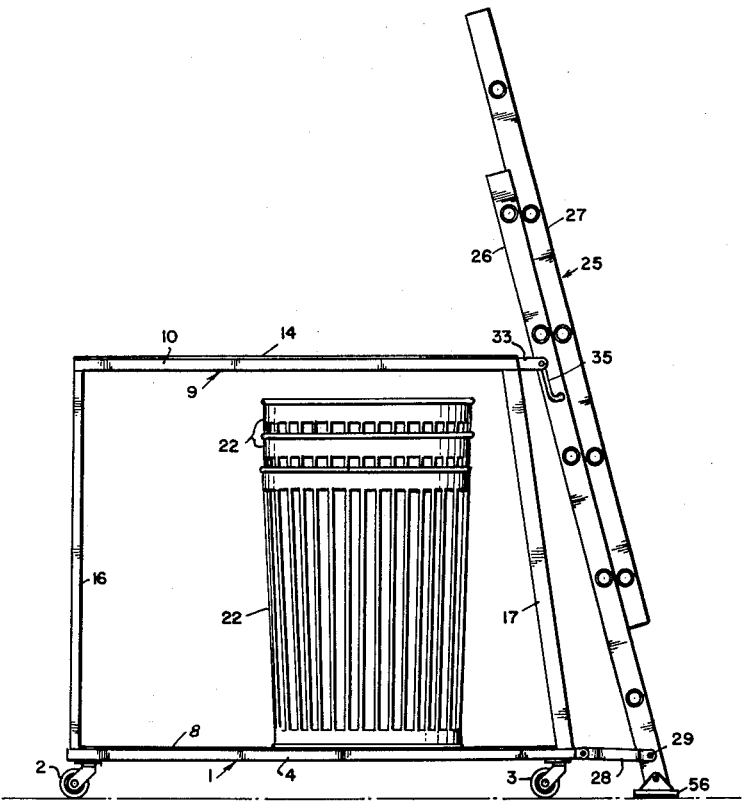
FIGURE 6 is a view similar to FIGURE 1 with the tray removed and showing a plurality of refuse receptacles nested one within the other and supported upon the bottom floor of the cart.

With continuing reference to the drawings, reference numeral 1 indicates generally the bottom frame of the cart supported upon forward and rearward caster wheels 2 and 3, respectively, and comprising parallel side frame members 4 and 5 interconnected by front and rear cross members 6 and 7, and a flooring 8 is secured to the top of the frame member 1. A top frame member 9, similarly constructed of parallel side members 10 and 11 interconnected by front and rear cross members 12 and 13 is provided with a flooring 14 and supported in an elevated position from the bottom frame member by vertical front corner posts 16 and forwardly inclined rear corner posts 17.

Figure 7:
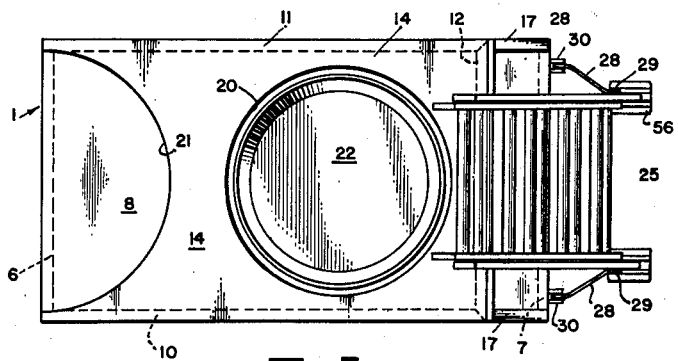
FIGURE 7 is a top plan view of FIGURE 6.

The top floor 14 (FIGURE 7) is provided with a circular opening 20 between its forward and rearward ends and recessed inwardly at its forward end as at 21. The opening 20 is of a diameter sufficiently greater than that of a standard refuse receptacle such as those indicated at 22 nested one within the other and supported upon the bottom floor 8, so that a number of such receptacles may be transported to various points of use and readily removed from the cart one at a time through the opening 20 without disturbing any other tools or materials reposing upon the floor 8.

An extension ladder indicated generally at 25 and comprising a forward section 26 and a rearward section 27 is swingably attached to the bottom frame 1 of the cart by means of a pair of arms 28 pivotally attached as at 29 to the bottom end of the forward ladder section 26 and pivotally attached at their opposite end to lugs 30 extending outwardly from the rear cross member 7 of the bottom frame. This forward section of the ladder is slidably and lockably attached to the top frame member 9 by means of pins 32 carried by lugs 33 secured to the rearward cross member 13 of the top frame. The pins are slidably engaged within slots 35 in the side rails 36 of the forward ladder section 26 and lockable relative to the rails in an offset bottom end portion 37 of the slots.

The rearward ladder section 27 is slidable between the rails 36 and slidably adjustable upwardly relative thereto, as shown in FIGURES 1 and 2, and lockable to the outer section 26 by conventional detents 40 swingably attached at their top ends as at 41 to the rails 42 of the rearward section and engageable at their lower ends with the rungs 45 of the forward ladder section 26.

For carrying articles at the top of the ladder as a convenience to the user I provide a box-like tray 47 having a bottom wall 48 and thereby bolted or welded to the inwardly turned top edges 50 of a pair of parallel supporting plates 51 provided at their rearward top corners with hook elements 52 engageable with pins 53 extending inwardly from the top end of the side rails 42 of the rearward ladder section 27. The bottom rear corners of the supporting plates 51 are flanged outwardly as at 54 to bear against the top end of the rails 36 of the forward ladder section. The flanges are formed on an angle complementary to the angularity of the forward tilt of the ladder so that when supported by both ladder sections when the rearward section is retracted relative to the forward section the tray will be maintained in a horizontal position, as shown in FIGURES 1, 2 and 3.

To the bottom end of each side rail of the forward ladder 26 is pivotally attached a foot 56 provided with a rubber pad, as shown, which, when bearing down on a floor under the weight of a user upon the ladder, whether or not the rearward section is in a retracted or extended position, will prevent unintentional movement of the cart, and any tilting of the cart will be prevented, because the center of gravity of the user upon the ladder will be forward of the point of contact of the feet 56 with the floor.

While I have shown a particular form of embodiment of my invention, I am aware that many minor changes therein will readily suggest themselves to others skilled in the art without departing from the spirit and scope of the invention. Having thus described my invention what I claim as new and desire to protect by Letters Patent is:

1. A utility cart comprising a floor covered wheel supported bottom frame, a floor covered top frame secured in elevated relation to said bottom frame by vertical front corner posts and by forwardly inclined rear corner posts, an extension ladder made up of forward and rearward sections carried as a unit by the cart, the forward section of said ladder pivotally slidably and lockably attached to one end of the cart and the ladder in its entirety tilted forwardly relative to the rearward end of the cart and at all times extending above said top frame, a pair of spaced apart tray-supporting plates, a tray secured to said plates, means integrated with said plates interengaging the top end of both ladder sections when said rearward ladder section is retracted relative to said forward section whereby to support said tray in a horizontal position, and means carried by said forward ladder section and engageable with a floor for preventing unintentional movement of the cart with said forward section or the ladder in its entirety in a lowered position or with said forward section in a lowered position and said rearward section in any extended position relative to said forward section.

2. A utility cart comprising a floor covered wheel supported bottom frame, a floor covered top frame secured in elevated relation to said bottom frame by vertical front corner posts and by forwardly inclined rear corner posts, the floor of said top frame having an opening therein whereby articles carried by the floor of the bottom frame may be removed from the cart upwardly through said opening without disturbing articles carried by either floor of the top frame or bottom frame, an extension ladder made up of forward and rearward sections carried as a unit by the cart, the forward section of said ladder pivotally slidably and lockably attached to one end of the cart and the ladder in its entirety tilted forwardly relative to the rearward end of the cart and at all times extending above said top frame, a pair of spaced apart tray-supporting plates, a tray secured to said plates, means integrated with said plates interengaging the top end of both ladder sections when said rearward ladder section is retracted relative to said forward section whereby to support said tray in a horizontal position, and means carried by said forward ladder section and engageable with a floor for preventing unintentional movement of the cart with said forward section or the ladder in its entirety in a lowered position or with said forward section in a lowered position and said rearward section in any extended position relative to said forward section.

References Cited in the file of this patent

UNITED STATES PATENTS

| | | |
|---|---|---|
| 1,837,664 | Longan | Dec. 22, 1931 |
| 2,398,812 | Steil | Apr. 23, 1946 |
| 2,536,492 | Dunn et al. | Jan. 2, 1951 |
| 2,630,961 | Burg | Mar. 10, 1953 |
| 2,707,585 | Hoey | May 3, 1955 |
| 2,794,583 | Ernst | June 4, 1957 |
| 2,980,200 | Kibby | Apr. 18, 1961 |

FOREIGN PATENTS

| | | |
|---|---|---|
| 163,266 | Sweden | May 13, 1958 |